United States Patent [19]

Dorguin

[11] Patent Number: 5,715,603
[45] Date of Patent: Feb. 10, 1998

[54] DEVICE FOR CUTTING METALS OR CONCRETE

[76] Inventor: Jean-Pierre Dorguin, Barbe-en-Croc, F-08430 Mondigny, France

[21] Appl. No.: 668,844

[22] Filed: Jun. 24, 1996

[30] Foreign Application Priority Data

Jun. 26, 1995 [FR] France ................ 95 07633

[51] Int. Cl.⁶ .................................... B23D 17/00
[52] U.S. Cl. .......................... 30/134; 241/101.73
[58] Field of Search ............. 30/134, 271, 228; 241/101.73

[56] References Cited

U.S. PATENT DOCUMENTS

| | | | |
|---|---|---|---|
| 4,616,417 | 10/1986 | Gross | 30/134 |
| 5,187,868 | 2/1993 | Hall. | |
| 5,359,775 | 11/1994 | Morikawa et al. | 30/134 |

FOREIGN PATENT DOCUMENTS

| | | |
|---|---|---|
| 0 330 349 | 8/1989 | European Pat. Off. . |
| 0 353 363 | 2/1990 | European Pat. Off. . |
| 0 362 098 | 4/1990 | European Pat. Off. . |
| 2 236 965 | 4/1991 | United Kingdom . |

*Primary Examiner*—Douglas D. Watts
*Attorney, Agent, or Firm*—Young & Thompson

[57] ABSTRACT

A cutting device, particularly for cutting metals or concrete, is mounted at the end of a working arm (1) of a mobile machine. The device comprises on the one hand an assembly (2) adapted to be secured to the working arm (1) and, on the other hand, a complementary member (8) mounted and guided in rotation on the assembly. The device comprises a rotational guide coacting with a shock absorbing member in the closed position corresponding to cutting and a pressure device ensuring a predetermined lateral spacing of the working ends, so as to prevent lateral spacing of the cutting ends (C) of the device.

10 Claims, 3 Drawing Sheets

DEVICE FOR CUTTING METALS OR CONCRETE

FIELD OF THE INVENTION

The present invention relates to a cutting device, particularly for cutting metals or concrete.

BACKGROUND OF THE INVENTION

The document EP-0 362 098 B1 describes a concrete breaking pliers, of the type comprising a rotatably mounted frame, carrying not only pliers arms of which at least one is movable relative to the frame, but also cutting members. The frame is comprised by two flanges and the cutting members are mounted, on the one hand, on at least one fixed arm comprised by an extension of one of the flanges and, on the other hand, on the movable arm of the pliers. The fixed and movable arms are in side-by-side position in the widest open position of the pliers, so as to impart to the cut its maximum closure in this position. The cutting blades of the cutter are removable and constituted by toothed plates with a disymmetric profile, mounted adjustably in position on the corresponding arms.

This known device is generally satisfactory but has the drawback of requiting a change of orientation of the tool, depending on whether one wishes to break concrete or to cut the reinforcing rods of the concrete.

To overcome this drawback, the art has moved toward the use of universal tools called by specialists "cutting arms". These universal tools are adapted to cut not only the iron work, but also the concrete, without requiting particular adaptation. These universal tools are generally mounted directly at the front end of a utility vehicle at the work site and actuated directly by the operating jack of this machine. The jaws of the cutting arms comprise points for breaking concrete at their forward end, elbowed blades to crush the concrete or to effect manipulation of the material and cutting blades for the iron work at their rear end.

SUMMARY OF THE INVENTION

The invention has for its object to improve the cutting arms of known type, by absorbing shocks due to closure of the cutting jaws and by preventing lateral opening of the jaws during cutting.

The invention has for its object a cutting device, particularly for cutting metals or concrete, adapted to be mounted at the end of a working end of a utility vehicle at the work site and comprising: on the one hand, an assembly adapted to be secured to said working arm, and, on the other hand, a complementary member mounted and guided in rotation on said assembly by being controlled by a jack for actuating said vehicle, characterized in that the rotational guide means coact with a shock absorbing member in the closed position corresponding to cutting and bearing means ensuring lateral spacing of the working ends of said assembly and of said member, so as to prevent lateral spacing of the cutting ends of said assembly and of said member during cutting.

According to other characteristics of the invention:
- the rotational guide means comprise a throat in the arc of a circle at one end of which is mounted said shock absorbing member and a guide axle in said throat exerting a pressure ensuring said predetermined lateral spacing during cutting;
- the circular arc-shaped throat is provided in said assembly and the guide axle is secured to said member;
- the shock absorbing member is a fluid shock absorber, of the oleopneumatic, hydraulic or like type;
- the shock absorbing member is an elastic shock absorber;
- the shock absorbing member comprises a mechanical abutment having a configuration for receiving the guide axle and extending beyond into said throat in the arc of a circle;
- the shock absorbing member is subjected to the action of a resilient means which makes it continuously extend beyond said throat in the arc of a circle;
- the pressure means assuring lateral spacing of the manipulating end supplies the guide axle against the bottom of the guide throat in the arc of a circle;
- a friction ring is interposed between the guide axle and the bottom of the throat in the arc of a circle;
- the pressure means comprises a closure cap transmitting force exerted by elastically prestressed securement means to the guide axle to place the latter continuously in bearing relation against the bottom of the guide throat.

BRIEF DESCRIPTION OF THE DRAWINGS

The invention will be better understood from the description which follows, given by way of nonlimiting example, with reference to the accompanying drawings, in which.

DESCRIPTION OF THE PREFERRED EMBODIMENT

Figure 1:
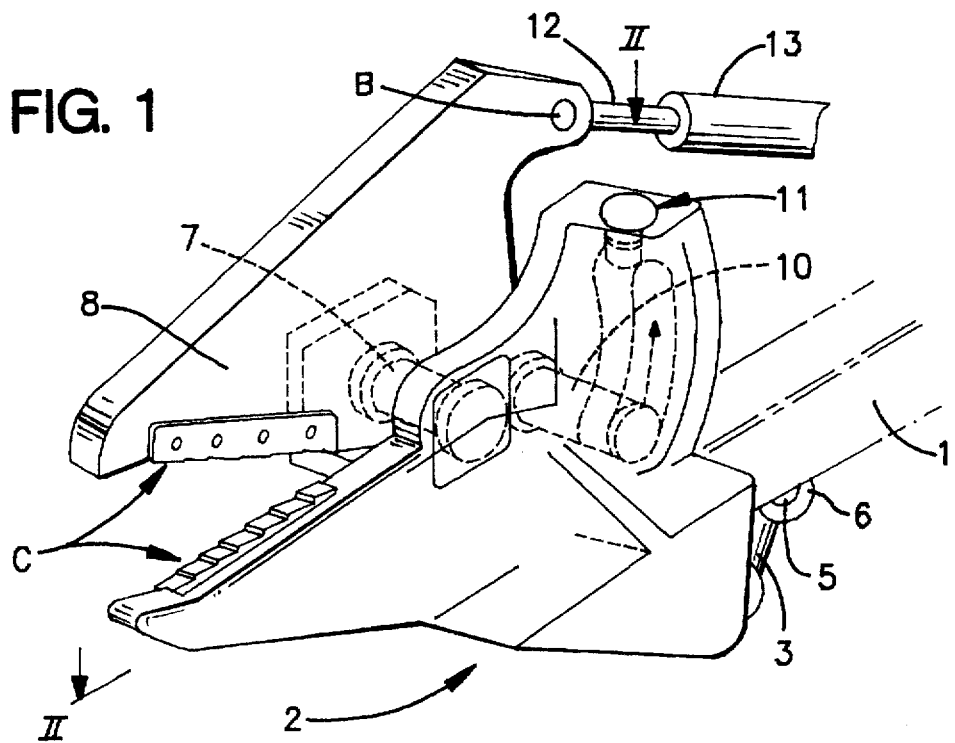
FIG. 1 shows schematically a perspective view with parts broken away of a device according to the invention in the open position.
Figure 2:
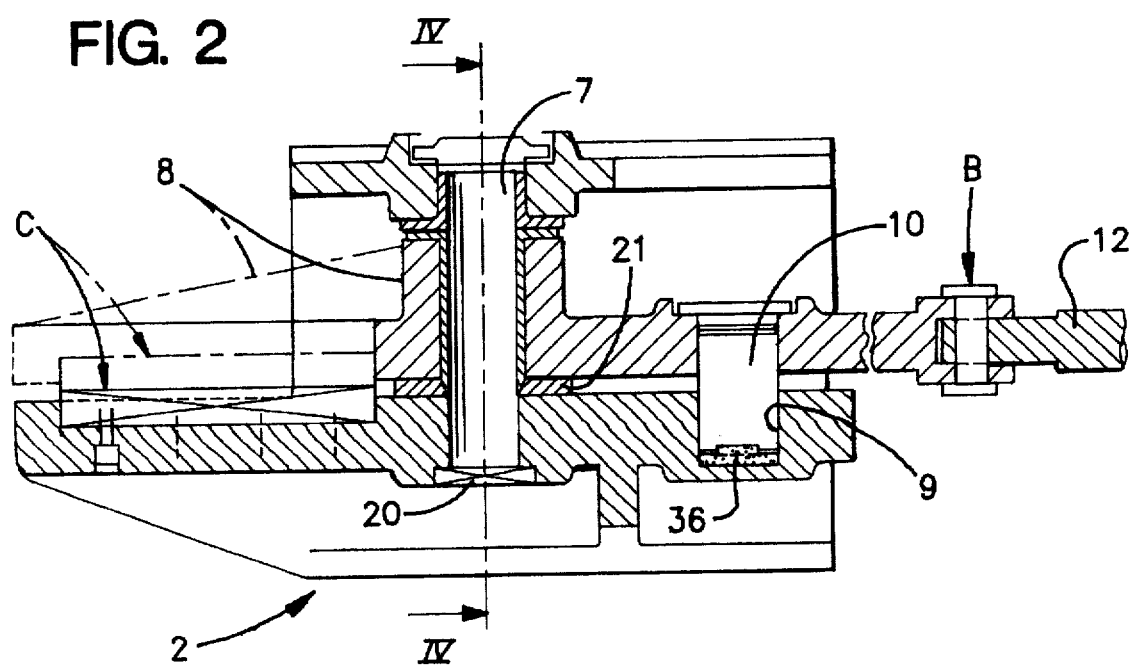
FIG. 2 shows schematically a view in cross section on the line II—II of FIG. 1 of a device according to the invention in the open position.
Figure 3:
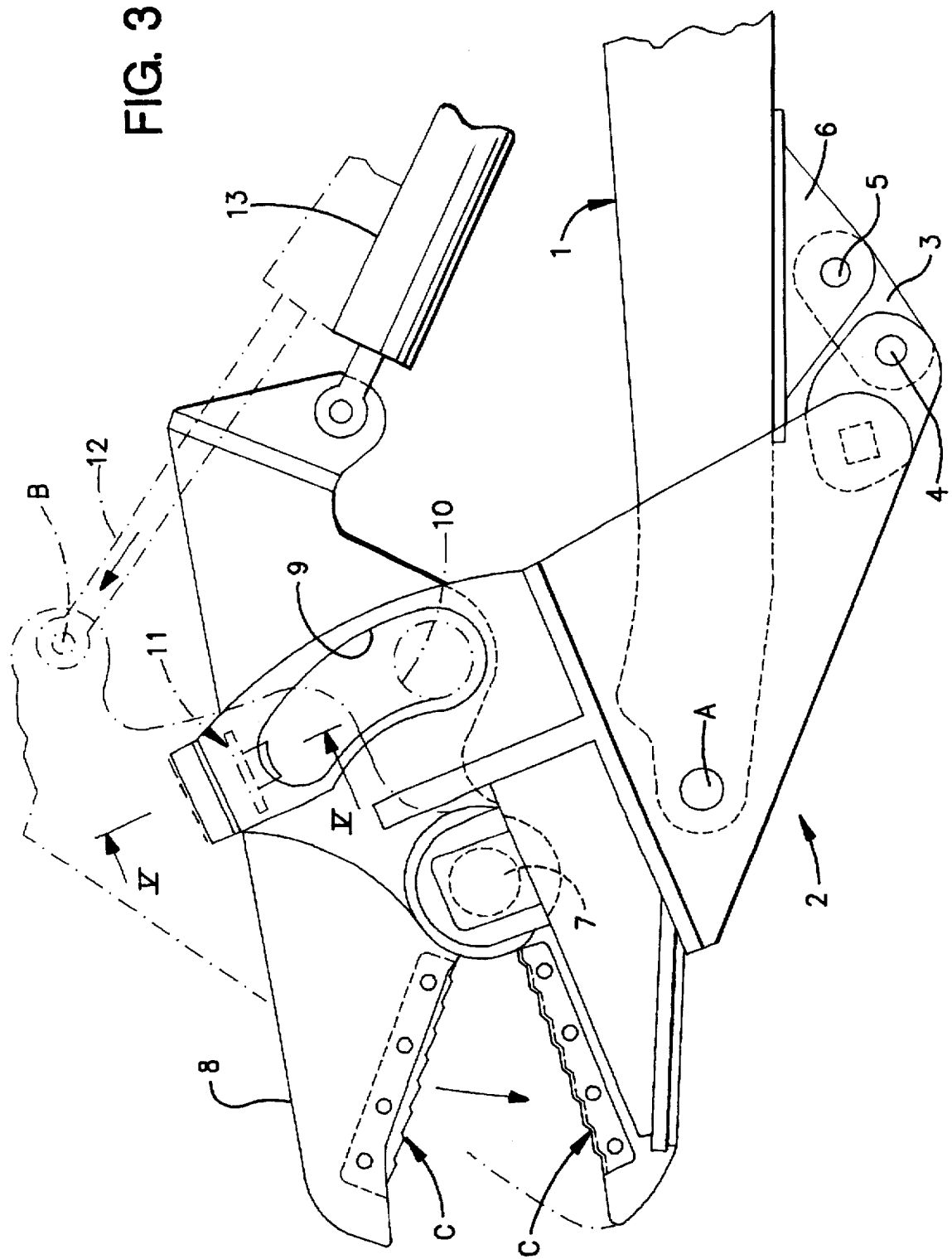
FIG. 3 shows schematically a side elevational view of a device according to the invention.

Referring to FIGS. 1–3, a cutting device for cutting metals or concrete is mounted at the end of a working arm 1 of a vehicle of the digger type or the like. The device comprises an assembly 2 fixed to the working arm 1 by means of an axle A of articulation and a force-transmitting link 3 articulated at 4 on a working end of the device and at 5 on a lug 6 secured to the working arm 1. The assembly has at least locally a U-shaped configuration for mounting a rotational axle 7 on which is articulated a complementary member 8. The complementary member 8 is rotatably mounted about the axle 7, so as to effect a spacing or an approach to each other (in the direction of the arrow R of FIG. 3) of the cutting blades C mounted on the one hand on the complementary member 8 and on the other hand on said assembly 2. This arrangement of known type permits cutting metal or concrete grasped between the cutting ends bearing the blades C, when the member 8 is controlled by the actuating jack 13 to the piston rod 12 of which it is articulated at B.

The complementary member 8 is on the other hand guided in rotation relative to the assembly 2 by guide means comprising a throat 9 in the arc of a circle and a guide axle 10 moving in said throat 9. In this example, the throat 9 is provided in the fixed assembly 2 of the arm 1 and the guide axle 10 is secured to the complementary member 8: the invention also covers the case in which the throat will be secured to the complementary 8 whilst the guide axle will be secured to the assembly 2, this kinematic reversal being well known to those skilled in the art.

According to the invention, the rotational guide means coact with a resilient shock absorber 11 in the closed position corresponding to cutting and with pressure means ensuring a predetermined lateral spacing of the working ends of the assembly 2 and of the complementary member 8, so as to prevent undesirable lateral spacing of the cutting ends bearing the blades C.

Thus, in the closed position corresponding to cutting, the elastic shock absorber means 11 avoid shock due to the arrival in mechanical abutment at the end of the path and to the reaction due to cutting forces; whilst the pressure means act on the working ends of the device connected on the one hand to the arm 1 and on the other hand to the rod 12 of an actuating jack 13 of the machine prevents, by the lever effect, the undesirable lateral spacing of the cutting blades C during cutting.

Figure 4:
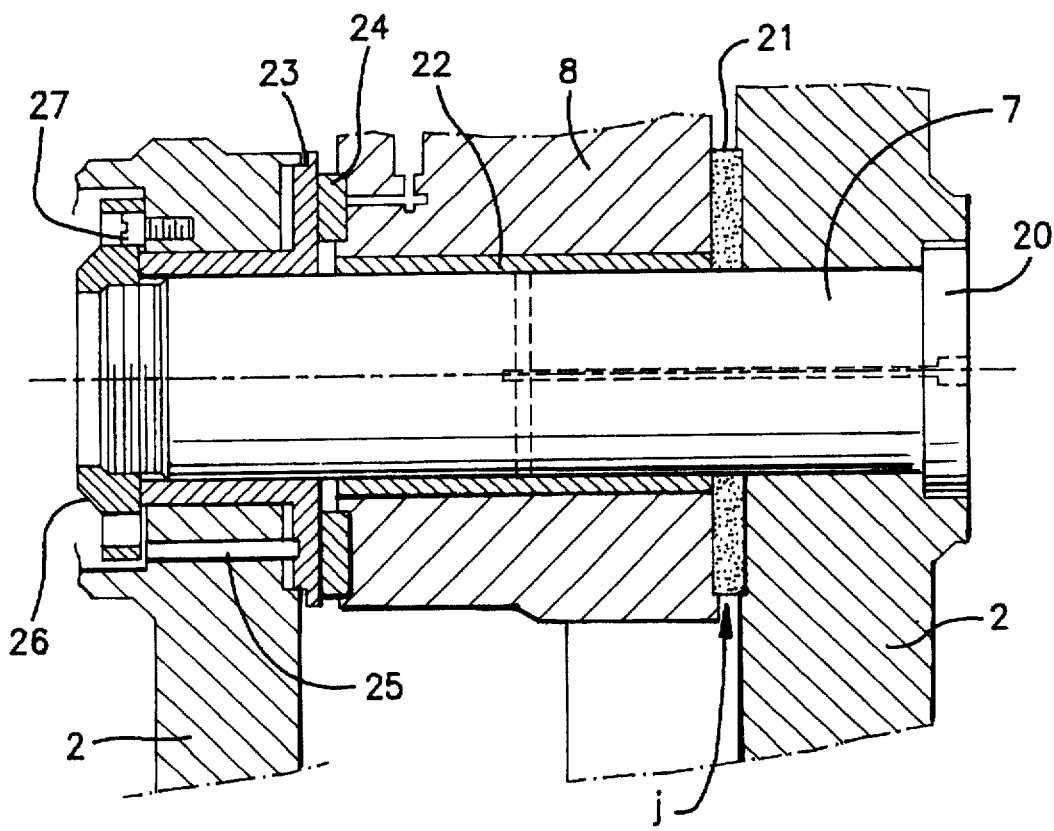
FIG. 4 shows schematically a view in partial diametric cross section along the line IV—IV of FIG. 2, of a device according to the invention in the vicinity of the rotational axis.

Referring to FIG. 4, the principal rotational axle has a squared head 20 engaged in a corresponding recess of the assembly 2 and passes through the complementary member 8 which is applied mechanically against a friction ring 21 and rotatably mounted on a sleeve 22, the complementary member 8 is subjected to the pressure of a flange 23 bearing on a friction ring 24. The flange 23 is retained in rotation by a pin 25 and subjected to the pressure of a nut 26 screwed on the end of the shaft 7 opposite the squared head 20. After having screwed the nut 26 to effect a predetermined adjustment corresponding to the desired pressure, it is secured to the other arm of the assembly 2 by means of removable screws 27. Thus, the spacing between the branch of the assembly 2 bearing the cutting blade C and the complementary member 8 is predetermined and corresponds substantially to a play J of cutting predetermined to obtain a lateral spacing of the jaws which is continuously less than one millimeter.

Figure 5:
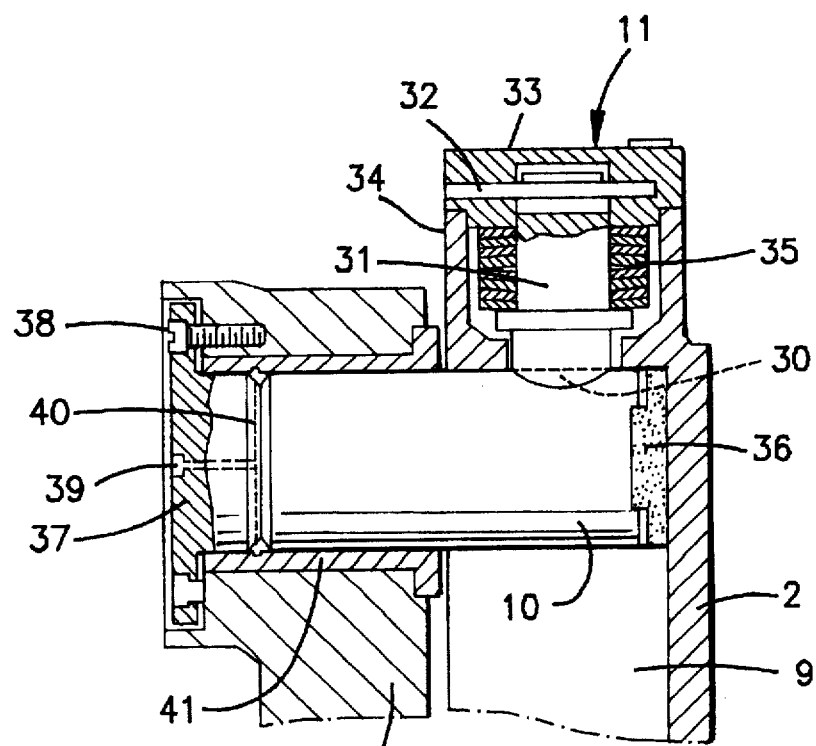
FIG. 5 shows schematically a view in partial cross section on the line V—V of FIG. 3, of rotational guide means of a device according to the invention in the closed position.

Referring to FIG. 5, the elastic shock absorbing means 11 forming also a mechanical end of path abutment, comprises a configuration 30 for reception of the guide axle 10, for example a cylindrical hollowed machining of a diameter corresponding to that of the guide axle 10. The elastic shock absorbing member comprises a piston 31 fixed against rotation by an axle 32. The axle 32 is mounted in a cap 33 closing the sleeve 34 containing the piston 31. The piston 31 is placed under pressure by resilient means 35 constituted for example by a stack of Belleville washers. Preferably, in the open position of the jaws of the device, the end 30 of the piston 31 slightly extends beyond the interior of the throat 9 by a predetermined distance of the order of one or several millimeters.

Thus, upon arriving in abutment at the end of the closure movement, the guide axle 10 is shock absorbed by the shock absorber piston 31 which absorbs the shocks resulting from the cutting forces.

The guide axle 10 is prestressed against a frictional washer 36 secured to the axle 10 in its guided movement by the guide throat 9. Permanent pressure of the guide axle 10 on the bottom of the throat 9 by means of the washer 36 thus produces a lateral spacing of the working ends opposite the cutting ends of the device: thus, during cutting, this permanent pressure opposes the lateral spacing of the cutting blades C and improves the effectiveness of cutting whilst reducing wear on the blades.

To effect prestressed pressure of the axle 10 and of the friction washer 36 on the bottom of the throat 9, there is provided another lateral cap 37 screwed in the sleeve 41 which permits pressing the axle 10 and the friction washer 36 against the bottom of the throat 9 after adjustment of the play by screwing, the cap 37 is prevented from rotation by a screw 38. To minimize friction of contact of the end of the axle 10 and the cap 37, there is provided a lubrication through channel 39 or the imposition of a friction ring 40.

A friction sleeve 41 is preferably provided to avoid seizing of the axle 10 during displacement movement in the guide throat 9. Thus, the axle 10 is both mounted prestressed against the bottom of the throat 9 by means of the washer 36 and free in rotation on itself. This mounting with free rotation permits obtaining effective guidance and avoids any risk of seizure or premature wear in the course of working of the machine.

Although the invention has been described with reference to a particular embodiment, it is not thereby limited but on the contrary covers all modifications of shape and variations of structure within the scope and spirit of the invention. Thus, instead of providing an elastic shock absorbing means, there could also be provided any other shock absorber means (hydraulic oleopneumatic, spring blade, . . . ) and any other pressure means ensuring relative pressure of the working ends on each other to prevent by the lever effect any undesirable lateral spacing of the cutting ends of the device according to the invention.

I claim:

1. Cutting device for cutting metals or concrete, adapted to be mounted at the end of a working arm (1) of a workplace vehicle and comprising:

an assembly (2) adapted to be secured to the working arm (1);

a complementary member (8) adapted to be controlled by the vehicle;

rotational guide means (9, 10) for mounting and guiding said complementary member (8) on said assembly;

a shock absorbing member (11) abutting said rotational guide means in a closed cutting position of said device, a pressure means (37) coacting with said rotational guide means for ensuring a lateral spacing of working ends of said assembly (2) and of said complementary member (8) to prevent lateral displacement of cutting ends (c) of said assembly (2) and of said complementary member (8) during cutting.

2. Device according to claim 1, wherein the rotational guide means (9, 10) comprise:

an arc-shaped throat (9) at one end of which is mounted said shock absorbing member (11); and a guide axle (10) in said throat (9) exerting force to ensure said lateral spacing during cutting.

3. Device according to claim 2, wherein the throat (9) is provided in said assembly (2) and the guide axle (10) is secured to said complementary member (8).

4. Device according to claim 2, wherein the shock absorbing member (11) is a fluid shock absorber.

5. Device according to claim 2, wherein the shock absorbing member (11) is an elastic shock absorber.

6. Device according to claim 1, wherein the shock absorbing member (11) comprises a mechanical abutment (31) having a reception configuration (30) for a guide axle (10) and extending beyond into an arc-shaped throat (9).

7. Device according to claim 6, further comprising elastic means (35) which continuously make said shock absorbing member extend into said throat (9).

8. Device according to claim 1, wherein the pressure means (37) presses a guide axle (10) against a bottom of an arc-shaped guide throat (9).

9. Device according to claim 8, further comprising a friction washer (36) interposed between the guide axle (10) and the bottom of the throat (9).

10. Device according to claim 8, further comprising an elastically prestressed securement means, and wherein the pressure means (37) comprises a closure cap (37) transmitting a force exerted by the elastically prestressed securement means to the guide axle (10) to make the guide axle press continuously on the bottom of the guide throat (9).

* * * * *